United States Patent
Fritz et al.

(10) Patent No.: US 12,367,719 B2
(45) Date of Patent: Jul. 22, 2025

(54) METHOD FOR INSPECTING A CONDITION OF A MOBILE USAGE UNIT OR OF A SERVICING STATION

(71) Applicant: DEERE & COMPANY, Moline, IL (US)

(72) Inventors: Norbert Fritz, Ilvesheim (DE); Martin Kremmer, Laumersheim (DE)

(73) Assignee: Deere & Company, Moline, IL (US)

( * ) Notice: Subject to any disclaimer, the term of this patent is extended or adjusted under 35 U.S.C. 154(b) by 343 days.

(21) Appl. No.: 17/444,309

(22) Filed: Aug. 3, 2021

(65) Prior Publication Data
US 2022/0068055 A1  Mar. 3, 2022

(30) Foreign Application Priority Data
Aug. 26, 2020  (DE) .......................... 102020122304.8

(51) Int. Cl.
*G07C 5/08* (2006.01)
*G06N 3/02* (2006.01)
*G07C 5/00* (2006.01)

(52) U.S. Cl.
CPC ............ *G07C 5/0816* (2013.01); *G06N 3/02* (2013.01); *G07C 5/006* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 6,237,647 B1 | 5/2001 | Pong et al. | |
| 6,382,269 B1 | 5/2002 | Tatsuno | |
| 7,565,917 B2 | 7/2009 | Kamiya et al. | |
| 9,458,006 B2 | 10/2016 | Quang | |
| 10,067,502 B1* | 9/2018 | Delp | G06Q 50/40 |
| 10,354,478 B2 | 7/2019 | Guo et al. | |
| 10,410,182 B1* | 9/2019 | Tang | G06T 7/001 |
| 10,585,439 B2* | 3/2020 | Buttolo | G05D 1/0246 |
| 11,388,899 B2 | 7/2022 | Long et al. | |

(Continued)

FOREIGN PATENT DOCUMENTS

| | | |
|---|---|---|
| AU | 2018204155 A1 | 1/2019 |
| CA | 3111039 A1 | 3/2020 |

(Continued)

OTHER PUBLICATIONS

European Search Report and Written Opinion issued in European Patent Application No. 21189553.7, dated Jan. 26, 2022, 9 pages.

(Continued)

*Primary Examiner* — James J Lee
*Assistant Examiner* — Melanie G Huber
(74) *Attorney, Agent, or Firm* — Taft Stettinius & Hollister LLP; Stephen F. Rost (57) ABSTRACT

A method for inspecting a current condition of a mobile usage unit by a servicing station or a current condition of a servicing station for servicing a mobile usage unit includes generating a current condition data representing the current condition via a sensor system, comparing the current condition data to reference data representative of a reference condition via a data processing unit, and depending on a result of the comparison, outputting information related to the current condition to an acoustic or optical display unit.

17 Claims, 5 Drawing Sheets

(56) References Cited

U.S. PATENT DOCUMENTS

| | | | | |
|---|---|---|---|---|
| 2004/0222904 | A1* | 11/2004 | Ciolli | G08G 1/052 340/937 |
| 2014/0049390 | A1 | 2/2014 | Wagner et al. | |
| 2014/0074667 | A1* | 3/2014 | Smith | G06Q 10/087 705/28 |
| 2014/0129076 | A1* | 5/2014 | Mouchet | B60C 23/0479 701/1 |
| 2015/0186691 | A1* | 7/2015 | Loop | G06Q 10/0833 340/10.51 |
| 2017/0121019 | A1 | 5/2017 | Shin et al. | |
| 2017/0234775 | A1 | 8/2017 | Finch et al. | |
| 2017/0363432 | A1 | 12/2017 | Hall et al. | |
| 2018/0096541 | A1 | 4/2018 | O'Brien et al. | |
| 2019/0009908 | A1 | 1/2019 | Perez Barrera | |
| 2019/0031343 | A1 | 1/2019 | Russell | |
| 2019/0135048 | A1* | 5/2019 | Thompson | B60C 11/24 |
| 2019/0176769 | A1 | 6/2019 | Strasdat et al. | |
| 2019/0266715 | A1* | 8/2019 | Myers | G06Q 10/20 |
| 2019/0304100 | A1* | 10/2019 | Hever | G06V 10/761 |
| 2019/0344679 | A1 | 11/2019 | Miller et al. | |
| 2019/0366375 | A1 | 12/2019 | Thompson et al. | |
| 2020/0064230 | A1* | 2/2020 | Kain Venkatadri | G06N 5/01 |
| 2020/0074763 | A1 | 3/2020 | Deng | |
| 2020/0122599 | A1* | 4/2020 | Lee | G06K 7/10297 |
| 2022/0068055 | A1 | 3/2022 | Fritz et al. | |
| 2022/0348322 | A1* | 11/2022 | Zemenchik | B64D 47/00 |

FOREIGN PATENT DOCUMENTS

| | | |
|---|---|---|
| CN | 205144465 U | 4/2016 |
| DE | 102012011538 A1 | 1/2013 |
| DE | 102012025033 A1 | 6/2014 |
| DE | 102018222650 A1 | 6/2020 |
| KR | 20160129786 | 11/2016 |
| WO | 2001/058735 A1 | 8/2001 |
| WO | 2014080385 A2 | 5/2014 |
| WO | WO2015088331 A1 | 6/2015 |
| WO | 2019038188 A1 | 2/2019 |
| WO | WO2020023269 A1 | 1/2020 |
| WO | WO2020041899 A1 | 3/2020 |

OTHER PUBLICATIONS

EPAC System, Extended Performance Air Cleaner by Maradyne Filtration Systems, accessed from <URL: maradynefiltration.com/epac-system.html> on Jul. 19, 2021, 1 page.

Geareye, The ultimate tracking solution for your gear, accessed from <URL: https://www.geareye.co> on Jul. 19, 2021, 10 pages.

GX390 Engine with Cyclone Air Cleaner, Honda Engines introduces new Cyclone Air Cleaner, accessed from <URL: https://www.heavyequipmentguide.ca/article/22534/honda-engines-introduces-new-cyclone-air-cleaner> on Jul. 19, 2021, 5 pages.

European Search Report issued in European Patent Application No. 21201136.5, dated Mar. 21, 2022, 5 pages.

European Search Report issued in European Patent Application No. 21201137.3, dated Mar. 18, 2022, 7 pages.

European Search Report issued in European Patent Application No. 21201139.9, dated Feb. 21, 2022, 7 pages.

\* cited by examiner

METHOD FOR INSPECTING A CONDITION OF A MOBILE USAGE UNIT OR OF A SERVICING STATION

RELATED APPLICATIONS

This application claims priority to German Patent Application No. 102020122304.8, filed Aug. 26, 2020, the disclosure of which is hereby expressly incorporated by reference in its entirety.

FIELD OF THE DISCLOSURE

The present disclosure relates to a method for inspecting a current condition of a mobile usage unit by a servicing station or a current condition of a servicing station, which is utilized for servicing a mobile usage unit.

BACKGROUND

Mobile usage units such as, for example, agricultural or forestry machines, are usually serviced at defined time intervals and, in so doing, are also inspected with respect to the current condition of various technical functions. There is a need, however, for efficiently carrying out a condition inspection for a mobile usage unit or for a servicing station that is servicing the mobile usage unit.

SUMMARY

According to the present disclosure, a method is utilized for inspecting a current condition of a mobile usage unit by a servicing station. Alternatively, the method is utilized for inspecting a current condition of a servicing station, which is used for servicing a mobile usage unit. In the method, current condition data are generated, which represent a current condition of the mobile usage unit or of the servicing station. The generated current condition data are compared to reference data (in the sense of a reference condition) that are provided. The result of the comparison can be, for example, a mathematical difference between the reference data and the current condition data. Depending on the result of the comparison, a piece of information relevant to the current condition is output.

The information contains, in particular, a statement regarding a qualitative or quantitative deviation of the current condition (actual condition) from a reference condition (setpoint condition).

The current condition relates, in particular, to at least one technical feature, which is relevant for the desired functional capability of the usage unit or of the servicing station.

The aforementioned method steps allow for a simple method structure, which offers an efficient inspection of a current condition at the usage unit or the servicing station with little data-related outlay. In addition, the aforementioned method steps allow for a technically simple automation of the desired inspection of a current condition. Therefore, an efficient (functional) diagnosis of the mobile usage unit or of the servicing state is possible with the method. Service personnel traditionally utilized for performing a function or condition inspection or a diagnosis can therefore be relieved.

The output of a piece of information depending on the result of the comparison also includes the possibility that the output of a piece of information does not take place in the case of certain results of the comparison. Advantageously, the output of a piece of information is omitted for the case in which the result of the comparison represents a current condition, which, according to the definition, does not require any further measures (for example, an additional inspection, repair, replacement of components) at the mobile usage unit or at the servicing station. Therefore, a user is informed, within the sense of data-saving and efficient communication, in particular only for the case in which further measures are actually required after the inspection of the current condition.

In order to increase the accuracy of the result of the comparison, specific external conditions (for example, light conditions, relative position of the servicing station, relative position of the usage unit) are identical or approximately identical during the generation of current condition data, on the one hand, and during the generation of reference data, on the other hand.

A piece of information is output for the case in which the result of the comparison exceeds or falls below a predetermined limiting value. Therefore, by the limiting value, it can be easily decided according to the method whether the current condition of the usage unit or of the servicing state is in order (the result of the comparison does not exceed or fall below the limiting value) and, therefore, an output of information is not required, or whether the current condition of the usage unit or of the servicing station is defective or faulty (the result of the comparison exceeds or falls below the limiting value) and, therefore, a piece of information is output. This supports efficient communication with the user. In addition, the taking into account of a limiting value allows for a technically simple specific adjustment of the defect tolerance of the method depending on the usage unit or servicing station to be inspected.

In one embodiment, the result of the comparison is processed in a neural network before a piece of information is output. In the neural network, the result of the comparison can be analyzed and processed with high accuracy. Such an artificial intelligence merely requires a specific definition phase and a specific learning phase (training phase) until these different results of the comparison can be sufficiently accurately interpreted. As a result, a more highly differentiated analysis and evaluation of the result of the comparison can be carried out with minor technical complexity. The content of the output information can also be more highly differentiated, for example, details regarding missing components, damage to or breakages at the usage unit, faulty positions or alignments of components at the usage unit.

Regardless of a specific determination or processing of the result of the comparison, the output information relates at least to one of the following current conditions:
- the absence of at least one component at the usage unit,
- a damage status at the usage unit,
- a wear status at the usage unit,
- a condition of a sensor system at the usage unit,
- a condition of a sensor system at the servicing station,
- a condition of an actuator system at the usage unit,
- a condition of an actuator system at the servicing station.

Information differentiated in this way is an advantageous support for the user or for a person entrusted with the technical maintenance in order to be able to carry out servicing or repair measures in a targeted and efficient manner.

The aforementioned damage status can relate to the mere fact of damage or also to a defined extent of damage. The aforementioned wear status can be utilized, in particular, for wearing parts at a mounted device (for example, a plow or another ground working implement) as the mobile usage unit. Wearing parts are often equipped with a (e.g., engraved) wear mark in order to detect wear. For the status of the wear, for example, a distance of an edge of the wearing part to the mark, the mere existence of the mark, or the absence of the mark can then be generated as current condition data.

The aforementioned current condition of a sensor system at the usage unit is intended to mean, for example, the current position or alignment of the sensor system deviating from the reference condition. The same applies for the current condition of a sensor system at the servicing station.

The aforementioned current condition of an actuator system at the usage unit or at the servicing station can refer to a deviation from an operating behavior of the actuator system to be anticipated according to the specification as the reference condition. For this purpose, appropriate commands are transmitted to the actuator system and their response is detected. In the case of a mobile usage unit designed as a tractor, the actuator system can be, in particular, a lifting gear in the form of a hydraulic power lift or a power take off (PTO) or a PTO drive unit.

In one embodiment, the current condition of the usage unit or of the servicing station is inspected by a sensor system. An optical sensor system, for example, at least one camera, is particular suitable.

The sensor system is arranged at the servicing station and is utilized for inspecting a current condition of the mobile usage unit. The current condition data (for example, image data) generated by this sensor system then represent a current condition of the usage unit. The reference data provided represent a reference condition of the usage unit. In this way, a qualitative or quantitative deviation of the current condition of the mobile usage unit from a desired setpoint condition or reference condition can be efficiently detected.

The reference condition of the usage unit is represented by a reference list, which contains the identifiers (for example, of a so-called RFID tag) of components in a reference condition (for example, the point in time of the complete manufacture) of the usage unit, i.e., before its condition inspection. In particular, this reference list contains the identifiers of all components of the usage unit that are relevant for the planned condition inspection. During the inspection of the current condition of the usage unit, a current list of the identifiers of currently present components of the usage unit can then be generated by a suitable sensor system (for example, one or multiple RFID antenna(s)). This current list is (alone or together with further data) a component of current condition data. By the result of the comparison according to the method, it can then be unambiguously detected, without any particular technical outlay, whether one or multiple component(s) is/are missing at the usage unit. In addition, on the basis of identifiers in the current list that deviate from the reference list, inferences can be drawn regarding a replacement of components at the usage unit that is not in order (for example, not permitted or manipulative).

The current condition of a sensor system is inspected as the current condition of the usage unit or of the servicing station since the particular sensor system can have a significant effect on the functional capability of the usage unit (for example, as a semi-autonomous or fully autonomous vehicle) or on the functional capability of the servicing station (for example, its quality of the condition inspection with respect to the usage unit).

In one embodiment, the sensor system to be inspected is arranged at the servicing station. The current condition of this sensor system can be inspected reliably and with little technical outlay, in that the sensor system itself generates current condition data (for example, image data), which represent a piece of inspection information that has been received, and in that the reference data provided represent a reference condition of the sensor system with respect to the same inspection information.

The inspection information is, for example, a three-dimensional object or a two-dimensional piece of image information or an optical pattern. Depending on a movable or immovable design of the servicing station, either the sensor system can be moved in relation to the direction of the inspection information or the inspection information can be moved in relation to the direction of the sensor system during the inspection.

The reference data provided are preferably generated in that the same sensor system detects the same inspection information in a reference condition, i.e., in a defined, technically error-free condition. The detected and, possibly, processed data can then be stored as reference data and retrieved again for the comparison with the current condition data according to the present disclosure. Therefore, a technically simple self-diagnosis of the servicing station is possible.

In order to increase the accuracy of the result of the comparison, specific external conditions (for example, illumination, lighting conditions, relative position of the servicing station with respect to the usage unit, relative position of the inspection information, movements of the inspection information) are identical during a generation of the current condition data, on the one hand, and during a generation of the reference data, on the other hand.

In another embodiment, the sensor system to be inspected is arranged at the mobile usage unit. For the inspection, this sensor system generates current condition data depending on a piece of test information that is received. The reference data provided represent a reference condition of the same sensor system with respect to the same test information that was received. In other words, the same sensor system has detected the same test information in a reference condition, i.e., in a defined, technically error-free condition.

The aforementioned test information allows for a reliable condition inspection of a sensor system of the usage unit with little technical outlay. The test information can be, for example, an electronic signal, an image, an optical pattern, or a moving object. The test information is preferably made available by the servicing station. The test information can be present at a defined ramp position or moving in space.

In order to increase the accuracy of the result of the comparison, in this case as well, specific external conditions (for example, illumination, lighting conditions, relative position of the usage unit with respect to the servicing station, relative position of the test information, movements of the test information) are identical or approximately identical during the generation of the current condition data, on the one hand, and during the generation of the reference data, on the other hand.

The sensor system can contain different sensors, detectors, or signal receivers. Preferably, an optical sensor, in particular a camera (for example, monocular, stereo), is particularly suitable. Further suitable sensors are UV sensors, ultrasonic sensors, radar sensors, antennas.

With respect to the antenna technology, this is, in particular, an RFID antenna. For example, this RFID antenna can register all components of the usage unit characterized with an RFID tag. These currently registered RFID tags can then be compared with the RFID tags (reference list) of all components of the usage unit in the error-free condition (reference condition). This comparison allows for a technically simple analysis with respect to any missing or improperly replaced components at the usage unit.

The comparison between the current condition data and the reference data provided is carried out in the servicing station. Alternatively, the information relevant to the current condition is output by the servicing station. These measures can advantageously limit the equipment outlay required for carrying out the method.

For a comparison of the current condition data with the reference data in the servicing station, the latter contains a suitable electronics system, for example, a microprocessor, at least one memory unit, a signaling or display unit.

Advantageously, the automated condition inspection according to the method is utilized in areas of application, in which specific automation functions are particularly suitable for increasing efficiency, for example, in large agricultural operations or in a (semi-) autonomous vehicle fleet. The latter can be, for example, a fleet of robots for mechanical weeding, of the type already utilized in viticulture and vegetable growing.

The mobile usage unit is a utility vehicle or any type of mobile working machine (for example, agricultural or forestry machine, construction machine) or a mounted device (for example, ground working implement, field sprayer, sowing machine, trailer). The mounted device can also be considered to be a mobile usage unit, provided it is movable at least when utilized for work. In particular, the mounted device is coupled to the utility vehicle (for example, a tractor) and, as a result, is movable at least during the working use of the utility vehicle.

The utility vehicle is designed, in particular, as a (semi-) autonomous vehicle. The level of automation of the vehicle can be efficiently increased with the disclosed method steps.

For the servicing station, it can be advantageous to design this partially (alongside a stationary subarea) or completely as a mobile servicing unit. The mobile servicing unit can be airborne (for example, flying drone) or land-based (for example, movable robot arm, traveling service vehicle). An at least partially mobile servicing station can carry out a condition inspection of the selected mobile usage unit(s) more efficiently and economically under certain basic conditions. This is the case, for example, when the usage unit is a component of a vehicle fleet, which is to be inspected with respect to the condition of all fleet vehicles.

The mobile servicing unit can also be utilized for acting upon certain coverings (for example, swivelable covers), in order to allow access to underlying functional areas of the mobile usage unit for a condition inspection. For this purpose, the mobile servicing unit (for example, flying drone, movable robot arm) can act upon the particular covering, for example, via electrical signals or a mechanical engagement, in order to open or close the covering.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
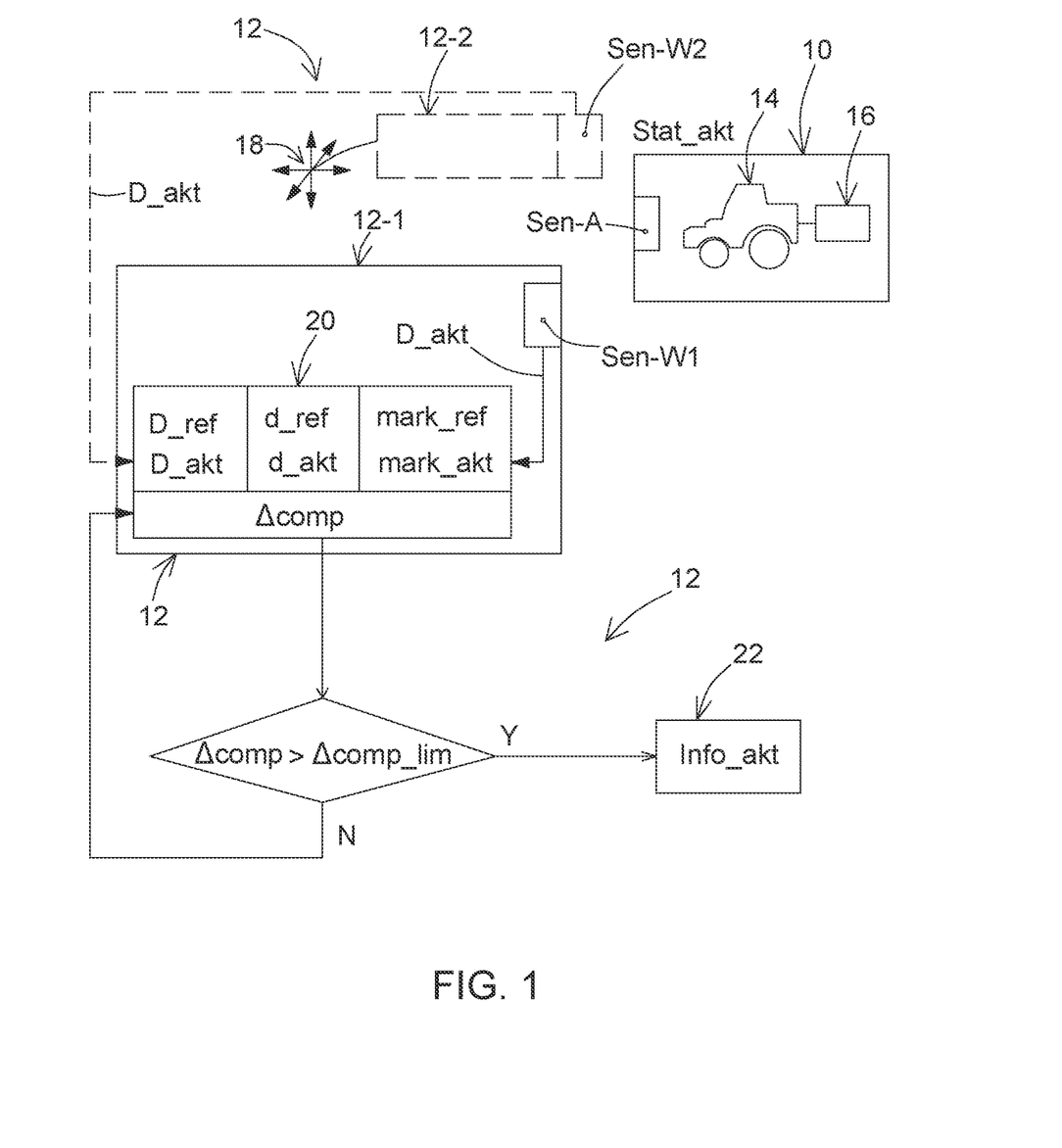
FIG. 1 shows a first exemplary embodiment of the method according to the present disclosure for inspecting the condition of a mobile usage unit.

FIG. 1 shows a mobile usage unit 10, the current condition Stat_akt of which is inspected by a servicing station 12. Generally, the servicing station 12 is utilized for servicing and inspecting the functioning of the usage unit 10. The usage unit 10 is made up of, for example, a tractor 14 or a mounted device 16 coupled thereto, for example, a plow or another ground working implement. Alternatively, the usage unit 10 contains a forestry vehicle or a construction machine.

The servicing station 12 allows for an automated inspection of a current condition Stat_akt of the usage unit 10. This not only supports driver-controlled tractors 14, but also especially autonomous or semi-autonomous tractors 14.

Figure 5:
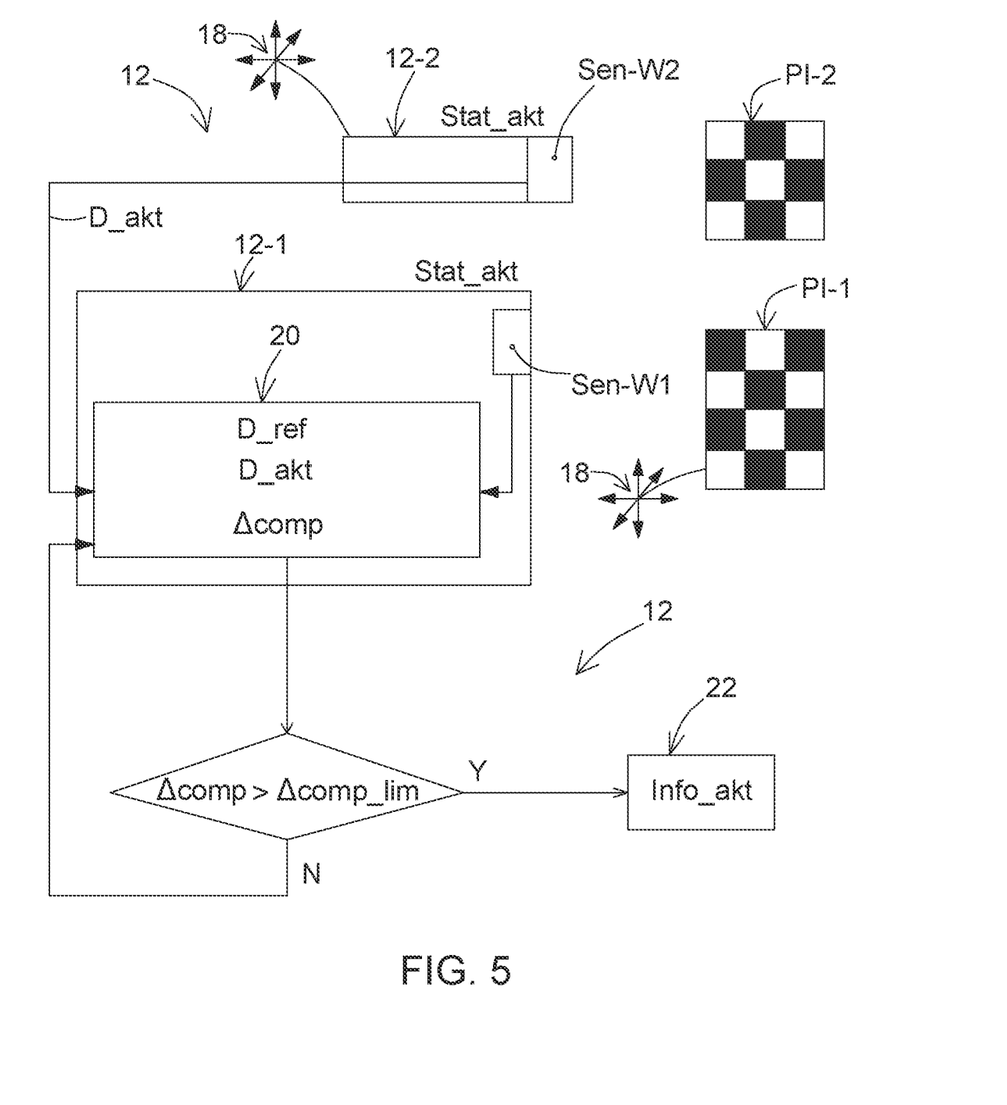
FIG. 5 shows an exemplary embodiment of the method according to the present disclosure for inspecting the condition of a servicing station.

The condition inspection of the usage unit 10 takes place by a servicing sensor system Sen-W1 or Sen-W2 arranged at the servicing station 12. Depending on the embodiment, the servicing station 12 contains an immovably arranged, stationary servicing unit 12-1 or a mobile servicing unit 12-2. In FIG. 1 as well as in FIG. 2 and FIG. 3, the mobile servicing unit 12-2 is represented with dashed lines, in order to indicate these as an optional component of the servicing station 12. In FIG. 5, the servicing station 12 in one further embodiment can also be designed without the mobile servicing unit 12-2.

The mobile servicing unit 12-2 can be movable in different, in particular all, spatial directions, as indicated by the arrow directions 18. For the condition inspection, the mobile servicing unit 12-2 can, for example, travel around the usage unit 10 along a defined route in a land-based manner as a service vehicle or, in an airborne manner, fly around the usage unit 10 along a defined flight path as a drone.

For the aforementioned condition inspection, the servicing sensor systems Sen-W1 or Sen-W2 generate current condition data D_akt, which represent a current condition Stat_akt of the usage unit 10. For this purpose, the servicing sensor system Sen-W1 or Sen-W2 contains, for example, at least one camera and then generates current image data as current condition data D_akt from the usage unit 10. Alternatively, the servicing sensor system Sen-W1 or Sen-W2 can contain a UV sensor, which can detect any leaks, for example, in combination with a fluorescent additive in hoses (for example, hydraulic hoses) of the usage unit 10. Further suitable sensors for the servicing sensor system Sen-W1 or Sen-W2 are, for example, ultrasonic sensors, radar sensors, antennas, in particular RFID antennas.

The generated current condition data D_akt are supplied to a data processing unit 20, which contains the usual components for a data processing, such as, for example, a microprocessor, memory, and the like. In the data processing unit 20, reference data D_ref is stored and made available, which represent a reference condition of the usage unit 10.

The reference data D_ref was generated temporally before the current condition data D_akt. For this purpose, preferably the same servicing sensor system Sen-W1 or Sen-W2 is utilized, which initially generates the reference data D_ref at identical specific conditions (for example, illumination, light conditions, relative position with respect to the servicing sensor system Sen-W1 or Sen-W2 with respect to the usage unit 10) and subsequently generates the current condition data D_akt during the servicing.

The data processing unit 20 is integrated into the servicing station 12. In the data processing unit 20, the current condition data D_akt are compared to the provided reference data D_ref. On the basis of this comparison, a result of the comparison Δcomp is obtained, for example, a mathematical difference. Depending on the determined result of the comparison Δcomp, the servicing station 12, in particular its servicing unit 12-1, outputs a piece of information Info_akt related to the current condition Stat_akt of the usage unit 10.

In particular, within the scope of efficient communication during the condition inspection, the information Info_akt is output only for the case in which the result of the comparison Δcomp infers an improper condition Stat_akt (for example, in need of repair, in need of cleaning, a component needs to be replaced) of the usage unit 10. For this purpose, in the embodiment of the method according to FIG. 1, an inspection is carried out to determine whether the result of the comparison Δcomp exceeds a predetermined limiting value Δcomp_lim.

When the limiting value Δcomp_lim is exceeded, the information Info_akt related to the improper current condition Stat_akt of the usage unit 10 is output in a display unit 22.

The display unit 22 is arranged at the servicing station 12 and is designed, in particular, as an acoustic (for example, speech output) or optical (for example, screen display) display unit 22. Service personnel, a driver of the usage unit 10, or another person can be informed by the display unit 22 In one alternative embodiment, the display unit 22 is arranged outside the servicing station 12, for example, where service personnel, a driver of the usage unit 10, or another person are/is usually situated during the activity.

The inspection of the current condition Stat_akt of the usage unit 10 on the basis of the current condition data D_akt contains, for example, at least one of the following conditions:
inspecting hoses of the usage unit 10 for any leaks,
inspecting the condition (for example, cleanliness, position, alignment) of a working sensor system Sen-A arranged at the tractor 14,
inspecting a general visual condition (for example, soiling to be cleaned after work usage) of the usage unit 10,
inspecting the usage unit 10 for any missing components,
detecting damage or wear at the usage unit 10.

In FIG. 1, two further examples of the inspection of wear at the usage unit 10 are disclosed. The current state of wear at the mounted device 16 (for example, a ground working implement in the form of a plow) is inspected. As the current condition data, either the current distance d_akt of a device edge to a (e.g., engraved) wear mark of the mounted device 10 is generated or the current (part) existence of nonexistence mark_akt of the wear mark is generated.

The current condition data are, for example, image data, which are generated by the servicing sensors Sen-W1 or Sen-W2.

Similar to the above-described method, the current distance d_akt is compared to reference data in the data processing unit 20, which represent a reference distance d_ref between the device edge and the wear mark when the mounted device 16 was manufactured. The result of the comparison Δcomp represents, for example, the difference d_ref−d_akt (for example, in mm or cm) and, thereby, a degree of wear. If this degree of wear is greater than a predetermined limiting value Δcomp_lim, a specific piece of information Info_akt regarding the current condition Stat_akt of the mounted device 16 is output. This information Info_akt contains, for example, an indication of a necessary replacement of the component having the device edge or of the entire mounted device 16 or an indication regarding a time interval for such a replacement.

In addition, similarly to the above-described method, the current condition of the wear mark mark_akt is compared to reference data in the data processing unit 20, which represent the complete existence of the wear mark mark_ref when the mounted device 16 was manufactured. The result of the comparison Δcomp represents differences (for example, quantitative or qualitative) between the original wear mark mark_ref and the current condition of the wear mark mark_akt. If the differences exceed a predetermined limiting value Δcomp_lim, a specific piece of information Info_akt regarding the current condition Stat_akt of the mounted device 16 is output. This information Info_akt contains, for example, an indication of a necessary replacement of the component having the wear mark or of the entire mounted device 16 or an indication regarding a time interval for such a replacement.

In conjunction with the result of the comparison Δcomp, it is to be noted that this variable—depending on different current conditions to be inspected or a different data processing in the data processing unit 20—is representative for different numerical values and, possibly, different physical units. The same applies for the predetermined limiting value Δcomp_lim, which is always qualitatively or quantitatively adapted to the particular current condition Stat_akt to be inspected.

Figure 2:
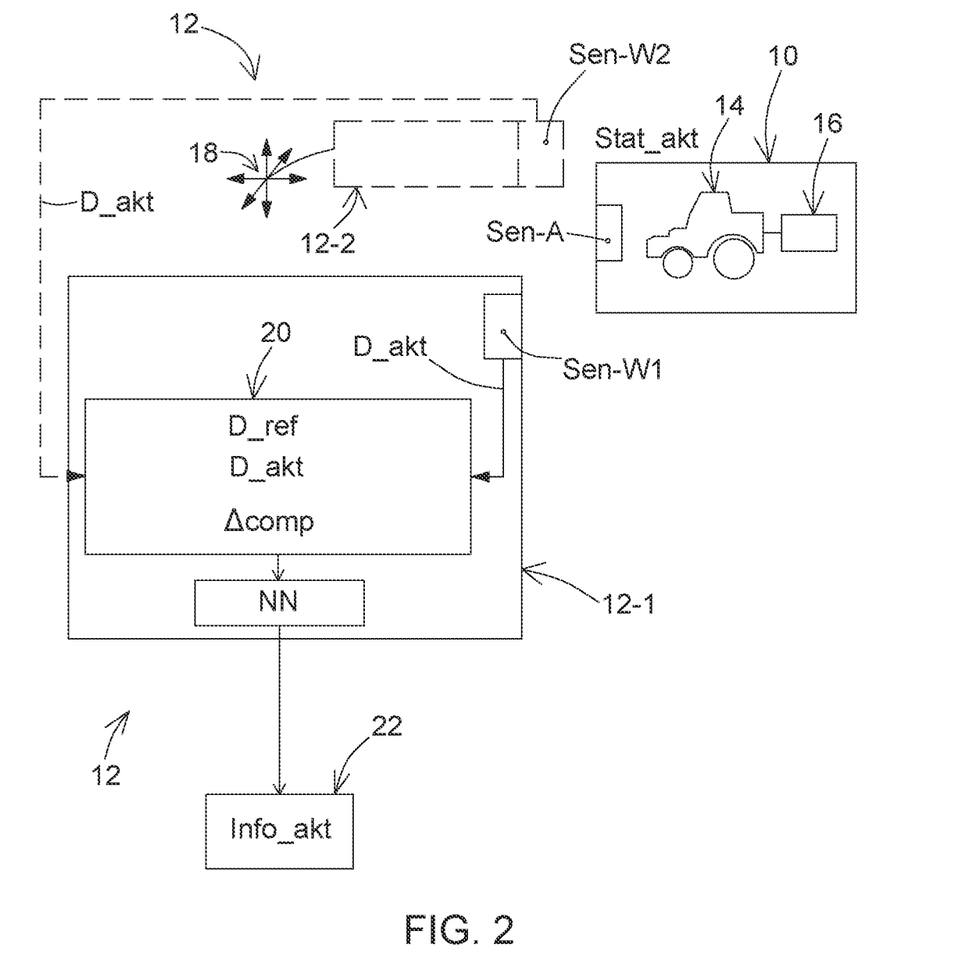
FIG. 2 shows one further first exemplary embodiment of the method according to the present disclosure for inspecting the condition of a mobile usage unit.

The servicing station 12 according to FIG. 2 differs from the embodiment according to FIG. 1 in that the result of the comparison Δcomp is analyzed and processed in a neural network NN before a piece of information Info_akt is output. Depending on the data analysis in the neural network NN, either no information Info_akt is output or a specific piece of information Info_akt related to the current condition Stat_akt to be inspected is output, for example, regarding a missing component at the usage unit 10, regarding a damage status at the usage unit 10, regarding a wear status at the usage unit 10, regarding a condition of the working sensor system Sen-A at the usage unit 10.

Figure 3:
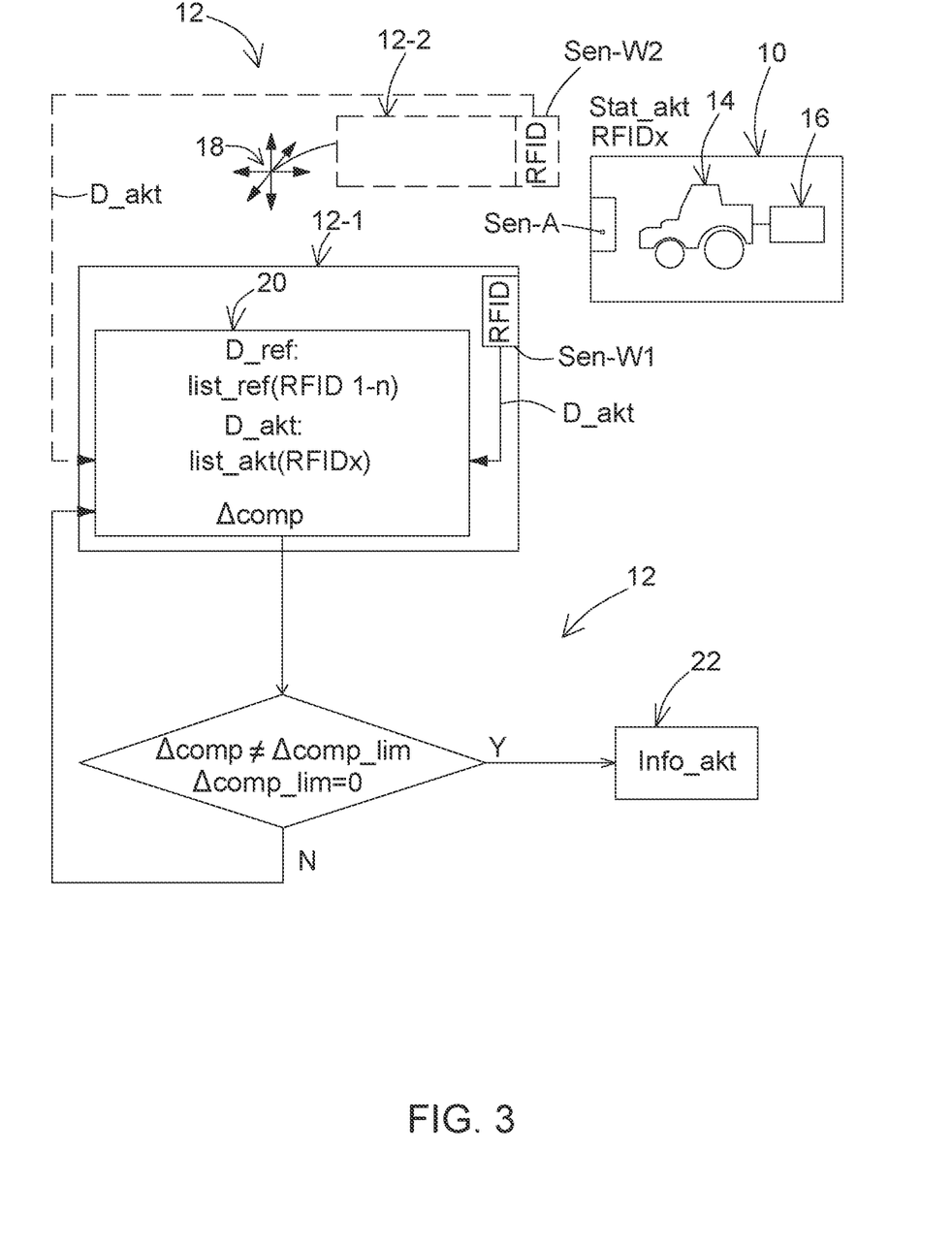
FIG. 3 shows one further first exemplary embodiment of the method according to the present disclosure for inspecting the condition of a mobile usage unit.

In the method implementation according to FIG. 3, the servicing sensor system Sen-W1 or Sen-W2 of the servicing station 12 include(s) at least one RFID antenna. The servicing sensor system Sen-W1 or Sen-W2 generates current condition data D_akt, which contain a current list list_akt with the RFID tags RFIDx of components, with the number x, currently existing at the usage unit 10. The current list list_akt is compared to a reference list list_ref as provided reference data. The reference list list_ref contains the RFID tags RFID1-n of the components to be inspected, with the number n that exists when the usage unit 10 is manufactured.

The content of the current list list_akt is compared to the content of the reference list list_ref. If the result of the comparison Δcomp assumes a predetermined limiting value Δcomp_lim=0, all expected components with the number n are also actually present. However, if the result of the comparison Δcomp deviates from the predetermined limiting value Δcomp_lim=0 (Δcomp≠0, the limiting value Δcomp_lim being exceeded or fallen below), a specific piece of information Info_akt is output. According to the RFID tags missing in the current list list_akt, the missing components can be unambiguously indicated as the current condition Stat_akt of the usage unit 10.

Figure 4:
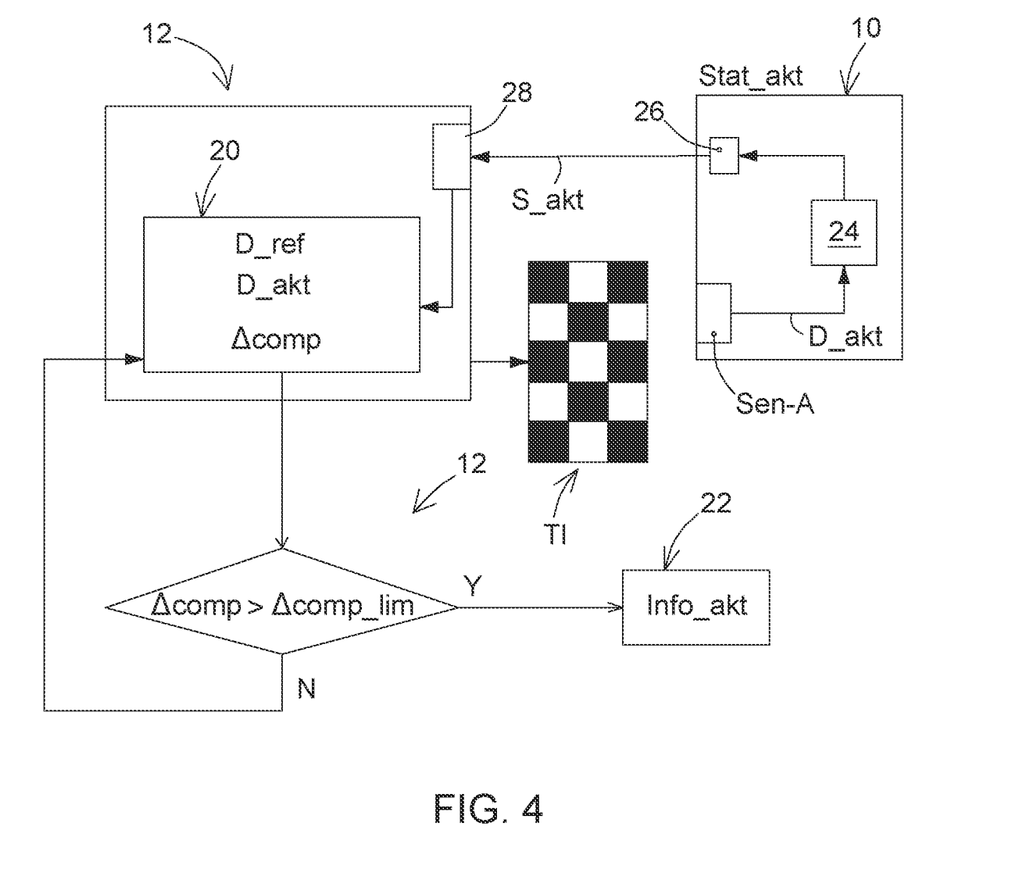
FIG. 4 shows one further first exemplary embodiment of the method according to the present disclosure for inspecting the condition of a mobile usage unit.

FIG. 4 shows a method variant, in which the current condition Stat_akt of the working sensor system Sen-A of the usage unit 10, in particular of the tractor 14, is inspected. For this purpose, the working sensor system Sen-A receives a piece of test information TI (for example, test signals, test image, moving test object). The test information TI is made available by the servicing station 12, either by the stationary servicing unit 12-1 or the mobile servicing unit 12-2.

The current condition data D_akt generated by the working sensor system Sen-A on the basis of the test information TI are processed in a diagnostic unit 24 and then forwarded to a data output interface 26. From there, the current condition data D_akt are transmitted as processed signals S_akt (preferably wirelessly) to a data input interface 28 of the servicing station 12. The data processing interface 28 is connected to the data processing unit 20. In the latter—as described above—the result of the comparison Δcomp is determined, which represents qualitative or quantitative deviations between the reference data D_ref and the current condition data D_akt.

The reference data D_ref represent a reference condition of the working sensor system Sen-A with respect to the test information TI. In other words, the reference data D_ref is generated on the basis of the same received test information TI by the same working sensor system Sen-A in an error-free functioning condition and under identical specific conditions (for example, illumination, lighting conditions, relative position of the working sensor system Sen-A with respect to the test information TI).

If the deviations between the reference data D_ref and the current condition data D_akt are low, i.e., at most as great as the predetermined limiting value Δcomp_lim, the working sensor system Sen-A has an acceptable functional condition and no information Info_akt is output. However, if the deviations are greater than the predetermined limiting value Δcomp_lim, this corresponds to a defective functional condition of the working sensor system Sen-A and the display unit 22 outputs an appropriate piece of information Info_akt.

Suitable sensors for the working sensor system Sen-A are, for example, optical sensors (in particular, at least one camera), UV sensors, ultrasonic sensors, radar sensors, antennas, in particular RFID antennas.

FIG. 5 shows a method variant, in which the current condition Stat_akt of the servicing sensor system Sen-W1 or Sen-W2 of the servicing station 12 is inspected. This is, therefore, a self-diagnosis of the servicing station 12. For this purpose, the servicing sensor system Sen-W1 receives a piece of inspection information PI-1 or the servicing sensor system Sen-W2 receives a piece of inspection information PI-2. The pieces of test information PI-1, PI-2 are, for example, inspection signals, inspection images, moving inspection objects.

The servicing sensor system Sen-W1 or Sen-W2 generates current condition data D_akt (for example, image data) on the basis of the received inspection information PI-1 or PI-2. The current condition data D_akt are supplied to the data processing unit 20, which compares these to the reference data D_ref.

The reference data D_ref represent a reference condition of the servicing sensor system Sen-W1 or Sen-W2 with respect to the test information PI-1 or PI-2. In other words, the reference data D_ref is generated on the basis of the same received test information PI1 or PI-2 by the same servicing sensor system Sen-W1 or Sen-W2 in an error-free functional condition and under identical specific conditions (for example, illumination, light conditions, relative position of the servicing sensor system Sen-W1 or Sen-W2 with respect to the test information PI-1 or PI-2).

In the case of the stationary servicing sensor system Sen-W1, before its condition inspection, the piece of inspection information PI-1 is moved in relation to the servicing sensor system Sen-W1. In the case of the mobile servicing sensor system Sen-W2, before its condition inspection, the mobile servicing unit 12-2 is moved in relation to the test information 12-2.

In the data processing unit 20, the result of the comparison Δcomp is determined, which represents qualitative or quantitative deviations between the reference data D_ref and the current condition data D_akt. If the deviations between the reference data D_ref and the current condition data D_akt are low, i.e., at most as great as the predetermined limiting value Δcomp_lim, the servicing sensor system Sen-W1 or Sen-W2 has an acceptable functional condition and no information Info_akt is output. However, if the deviations are greater than the predetermined limiting value Δcomp_lim, this corresponds to a defective functional condition of the servicing sensor system Sen-W1 or Sen-W2. The display unit 22 then outputs an appropriate piece of information Info_akt related to the current condition Stat_akt of the servicing station 12.

In addition to the diagnosis of the working sensor system Sen-A or the servicing sensor system Sen-W1, Sen-W2 described in conjunction with FIG. 4 and FIG. 5, the output information Info_akt can also relate to a condition of an actuator system (not shown) at the usage unit 10 or a condition of an actuator system (not shown) at the servicing station 12. The current condition of the actuator system relates, in this case, to a deviation from an operating behavior of the actuator system to be anticipated according to the specification as the reference condition. For this purpose, appropriate commands are transmitted to the actuator system from the diagnostic unit 24 and their response is detected by the data processing unit 20. In the case of a mobile usage unit 12 designed as a tractor 14, the actuator system can be, in particular, a lifting gear in the form of a hydraulic power lift or a power take off (PTO) or a PTO drive unit.

For the sake of completeness, it is pointed out that details disclosed in the drawings are at least partially merely schematic and are not necessarily represented true to scale.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for inspecting a current condition of a mobile usage unit comprising a mobile working machine and a mounted device by a servicing station, the method comprising:
generating reference data representative of a reference condition of the mobile usage unit, wherein the reference condition of the mobile usage unit is based on a specific external condition;
generating current condition data representing a current condition of the mobile usage unit via an RFID antenna and an optical sensor system arranged at the servicing station, wherein the generating current condition data includes: 1) a current list of identifiers of currently present components each having a respective RFID tag; 2) characterizing the currently present components having the RFID tag with the RFID antenna; and 3) image data generated by the optical sensor system and supplied to a data processing unit integrated into the servicing station, wherein the current condition data is generated based on the specific external condition of the reference condition;
comparing the current condition data to the reference data representative of the reference condition of the mobile usage unit via the data processing unit, wherein the reference data includes RFID tags of components in a reference condition; and
depending on a result of the comparison, outputting current condition information related to the current condition to an acoustic or optical display unit;
wherein the current condition data generated by the sensor system comprises the current list with identifiers of components of the mobile usage unit and the provided reference data contains a reference list of the identifiers of components in a reference condition of the mobile usage unit;
wherein the current list of identifiers of components information relates to at least one of a missing component or a wearing part at the mobile usage unit; and
wherein the specific external condition includes light conditions, relative position of the servicing station, or relative position of the usage unit.

2. The method as claimed in claim 1, wherein the current condition information is output when the result of the comparison exceeds or falls below a predetermined limiting value.

3. The method as claimed in claim 1, wherein the result of the comparison is processed in a neural network before the outputting step.

4. The method as claimed in claim 1, wherein current condition information further relates to at least one of
a damage status at the mobile usage unit,
a wear status of the wearing part at the mobile usage unit, wherein the wearing part includes a wear mark including an edge in order to detect wear, wherein the wear status of the wearing part is based on a distance between the edge and the wear mark,
a condition of the sensor system positioned at the mobile usage unit, and
a condition of an actuator system positioned at the mobile usage unit.

5. The method as claimed in claim 1, further comprising inspecting the current condition of the sensor system.

6. The method as claimed in claim 5, further comprising:
arranging the sensor system at the servicing station; and
generating the current condition data depending on received inspection information;
wherein, the provided reference data represent a reference condition of the sensor system with respect to the same received inspection information.

7. The method as claimed in claim 5, wherein:
the sensor system is arranged at the mobile usage unit and current condition data are generated depending on received test information; and
the provided reference data represent a reference condition of the sensor system with respect to the same received test information.

8. The method as claimed in claim 1, wherein the sensor system comprises an optical sensor including at least one camera, a UV sensor, an ultrasonic sensor, a radar sensor, or an antenna.

9. The method as claimed in claim 1, wherein:
the comparison between the current condition data and the provided reference data is carried out in the servicing station, or
the information related to the current condition is output by the servicing station.

10. The method as claimed in claim 1, wherein the mobile usage unit comprises a utility vehicle or a mounted device.

11. The method as claimed in claim 10, wherein the utility vehicle comprises an autonomous vehicle.

12. The method as claimed in claim 1, wherein the servicing station comprises a mobile servicing unit.

13. A method for inspecting a current condition of a mobile usage unit including one of an agricultural machine, a forestry machine, or a construction machine by a servicing station, comprising:
generating reference data representative of a reference condition of the mobile usage unit, wherein the reference condition of the mobile usage unit is based on a specific external condition;
generating current condition data representing the current condition of the mobile usage unit via an RFID antenna and a sensor system including an optical sensor, wherein the current condition data includes 1) a current list of identifiers of currently present components each having a respective RFID tag; 2) characterizing the currently present components having the RFID tag with the RFID antenna; and 3) image data generated by the optical sensor system, wherein the current condition data is generated based on the specific external condition of the reference condition;
comparing the current condition data to the reference data representative of the reference condition of the mobile usage unit via a data processing unit, wherein the reference data includes RFID tags of components in a reference condition;
processing a result of the comparison in a neural network, and
depending on a result of the comparison, outputting information related to the current condition to an acoustic or optical display unit;
wherein the information is output when the result of the comparison exceeds or falls below a predetermined limiting value,
wherein the information relates to a missing component of the mobile usage unit; and
wherein the specific external condition includes light conditions, relative position of the servicing station, or relative position of the usage unit.

14. The method as claimed in claim 13, further comprising inspecting the current condition by one or both of the RFID antenna and the sensor system.

15. The method as claimed in claim 14, wherein information relates to a damage status at the mobile usage unit, a wear status at the mobile usage unit, a condition of the sensor system positioned at the mobile usage unit or the servicing station, and a condition of an actuator system positioned at the mobile usage unit, wherein the wear status is based on a wearing part including a wear mark having an edge and the wear status is based on a distance between the edge and the wear mark.

16. The method as claimed in claim 14, wherein:
the sensor system is arranged at the mobile usage unit and current condition data are generated depending on received test information, and
the provided reference data represent a reference condition of the sensor system with respect to the same received test information.

17. The method as claimed in claim 13, wherein:
the comparison between the current condition data and the provided reference data is carried out in the servicing station, or the information related to the current condition is output by the servicing station.

\* \* \* \* \*